US012767214B2

(12) United States Patent
Guenther

(10) Patent No.: US 12,767,214 B2

(45) Date of Patent: Oct. 20, 2026

(54) METHOD FOR OPERATING A VEHICLE, AND VEHICLE

(71) Applicant: Robert Bosch GmbH, Stuttgart (DE)

(72) Inventor: Christian Guenther, Mutlangen (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 18/264,708

(22) PCT Filed: Dec. 2, 2021

(86) PCT No.: PCT/EP2021/083909

§ 371 (c)(1),
(2) Date: Aug. 8, 2023

(87) PCT Pub. No.: WO2022/179732

PCT Pub. Date: Sep. 1, 2022

(65) Prior Publication Data

US 2024/0051597 A1 Feb. 15, 2024

(30) Foreign Application Priority Data

Feb. 25, 2021 (DE) ..................... 10 2021 104 487.1

(51) Int. Cl.

*B62D 5/00* (2006.01)
*B60W 50/08* (2020.01)
*B62D 5/04* (2006.01)

(52) U.S. Cl.

CPC ......... *B62D 5/0463* (2013.01); *B60W 50/087* (2013.01); *B60W 2510/202* (2013.01)

(58) Field of Classification Search

CPC .. B62D 5/0463; B62D 5/0457; B62D 5/0006; B62D 6/10; B62D 15/025; B60W 50/087;

(Continued)

(56) References Cited

U.S. PATENT DOCUMENTS 4,724,711 A * 2/1988 Sakakibara ........... G01L 3/1457 180/444
6,152,254 A * 11/2000 Phillips .................. B62D 5/065 180/421

(Continued)

FOREIGN PATENT DOCUMENTS

DE 100 34 135 C1 10/2001
DE 101 59 830 A1 12/2002

(Continued)

OTHER PUBLICATIONS

International Search Report corresponding to PCT Application No. PCT/EP2021/083909, mailed Mar. 25, 2022 (German and English language document) (5 pages).

*Primary Examiner* — Logan M Kraft
*Assistant Examiner* — Sherman D Manley
(74) *Attorney, Agent, or Firm* — Maginot, Moore & Beck LLP

(57) ABSTRACT

The disclosure relates to a method for operating a vehicle, in particular a motor vehicle. The vehicle comprises a steering system with a steering handle, an actuator unit which is operatively connected to the steering handle, and at least one torque sensor, which is paired with the actuator unit, for detecting a torque signal.
According to the disclosure, a compensation torque which correlates to a systematic sensor offset of the torque sensor is ascertained in a calibration operational state and is superimposed onto the torque signal in an automated drive operation state in order to monitor a contact of the steering handle.

11 Claims, 4 Drawing Sheets

(58) Field of Classification Search
CPC . B60W 2510/202; G01L 5/221; G01L 25/003
See application file for complete search history.

(56) References Cited

U.S. PATENT DOCUMENTS

| | | | | |
|---|---|---|---|---|
| 8,909,428 | B1 * | 12/2014 | Lombrozo | B62D 1/04 701/41 |
| 9,096,262 | B2 * | 8/2015 | Urhahne | B62D 15/025 |
| 10,232,873 | B2 * | 3/2019 | Wijffels | B62D 1/181 |
| 10,988,173 | B2 * | 4/2021 | Goering | B62D 6/08 |
| 11,173,836 | B2 * | 11/2021 | Oesterwind | G07C 5/0816 |
| 11,338,846 | B2 * | 5/2022 | Nishioka | B62D 5/0463 |
| 11,572,096 | B2 * | 2/2023 | Suzuki | B62D 15/0265 |
| 11,628,874 | B2 * | 4/2023 | Tardy-Tuch | B62D 15/025 701/41 |
| 11,738,803 | B2 * | 8/2023 | Oesterwind | B62D 15/021 701/41 |
| 11,827,292 | B2 * | 11/2023 | Larminy | G08G 1/166 |
| 2003/0028306 | A1 * | 2/2003 | Fujimori | B62D 6/002 180/443 |
| 2005/0240328 | A1 * | 10/2005 | Shirato | B62D 1/286 701/1 |
| 2006/0113937 | A1 * | 6/2006 | Hidaka | H02P 21/05 318/434 |
| 2009/0069981 | A1 * | 3/2009 | Barthomeuf | B62D 5/0457 701/42 |
| 2010/0145579 | A1 * | 6/2010 | O'Brien | B62D 5/0457 701/42 |
| 2012/0290172 | A1 * | 11/2012 | Saez | B62D 5/04 29/829 |
| 2013/0197757 | A1 * | 8/2013 | Ellis | B62D 6/007 701/41 |
| 2013/0317699 | A1 * | 11/2013 | Urhahne | B62D 15/025 701/41 |
| 2014/0277944 | A1 * | 9/2014 | Bean | B62D 6/10 701/41 |
| 2016/0121924 | A1 * | 5/2016 | Norstad | B62D 5/0481 701/41 |
| 2016/0167707 | A1 * | 6/2016 | Lee | B62D 15/029 701/41 |
| 2017/0088167 | A1 * | 3/2017 | Fujii | B62D 1/286 |
| 2018/0009476 | A1 * | 1/2018 | Takayanagi | B62D 15/0225 |
| 2018/0186406 | A1 * | 7/2018 | Itou | B62D 5/0463 |
| 2018/0273087 | A1 * | 9/2018 | Schiebahn | B62D 15/025 |
| 2018/0281844 | A1 * | 10/2018 | Wijffels | B62D 5/0472 |
| 2019/0047619 | A1 * | 2/2019 | Tóth | G01L 5/221 |
| 2019/0118831 | A1 * | 4/2019 | Mimura | B60W 30/00 |
| 2019/0202454 | A1 * | 7/2019 | Komiyama | B60W 30/12 |
| 2019/0286127 | A1 * | 9/2019 | Watanabe | G05D 1/0061 |
| 2019/0315397 | A1 * | 10/2019 | Weigl | B62D 6/06 |
| 2019/0315398 | A1 * | 10/2019 | Moreillon | B62D 5/0463 |
| 2020/0031344 | A1 * | 1/2020 | Okano | B62D 1/286 |
| 2020/0108858 | A1 * | 4/2020 | Moreillon | B62D 15/021 |
| 2020/0231206 | A1 * | 7/2020 | Tsubaki | B62D 5/046 |
| 2020/0264062 | A1 * | 8/2020 | Park | G01L 25/003 |
| 2020/0398889 | A1 * | 12/2020 | Higashi | B62D 3/126 |
| 2021/0122412 | A1 * | 4/2021 | Kim | B62D 5/0409 |
| 2021/0162919 | A1 * | 6/2021 | Oesterwind | B62D 15/025 |
| 2022/0009548 | A1 * | 1/2022 | Nishioka | B62D 5/0463 |
| 2022/0097762 | A1 * | 3/2022 | Miyake | B62D 5/0463 |
| 2022/0227412 | A1 * | 7/2022 | Akatsuka | B62D 5/0469 |
| 2022/0227416 | A1 * | 7/2022 | Suzuki | B62D 15/025 |
| 2024/0116567 | A1 * | 4/2024 | Kitazume | B62D 5/0472 |
| 2024/0140525 | A1 * | 5/2024 | Maruyama | B62D 5/0457 |
| 2024/0174292 | A1 * | 5/2024 | Feick | B60W 30/12 |
| 2024/0343260 | A1 * | 10/2024 | Kunihiro | B60W 60/001 |
| 2024/0343302 | A1 * | 10/2024 | Kunihiro | B62D 6/007 |
| 2025/0100612 | A1 * | 3/2025 | Oya | B62D 15/025 |

FOREIGN PATENT DOCUMENTS

| | | | | |
|---|---|---|---|---|
| DE | 10 2008 037 870 | B4 | 7/2011 | |
| DE | 10 2015 016 217 | A1 | 6/2016 | |
| DE | 10 2017 126 074 | A1 | 5/2018 | |
| DE | 10 2018 123 615 | A1 | 3/2019 | |
| DE | 102008021862 | B4 * | 4/2019 | B62D 5/0457 |
| FR | 3094693 | A1 * | 10/2020 | B62D 15/025 |
| JP | 3244111 | B2 | 1/2002 | |

* cited by examiner

METHOD FOR OPERATING A VEHICLE, AND VEHICLE

This application is a 35 U.S.C. § 371 National Stage Application of PCT/EP2021/083909, filed on Dec. 2, 2021, which claims the benefit of priority to Serial No. DE 10 2021 104 487.1, filed on Feb. 25, 2021 in Germany, the disclosures of which are incorporated herein by reference in their entirety.

BACKGROUND

The disclosure relates to a method for operating a vehicle according to the preamble of claim 1 and a vehicle according to the preamble of claim 10. The disclosure also relates to a control unit having a computing unit for performing such a method.

Known from the prior art are vehicles comprising a conventional steering system having a steering handle, for example in the form of a steering wheel, a wheel steering angle actuator in the form of a steering gear, and a steering shaft for mechanically connecting the steering handle to the wheel steering angle actuator. Further known are vehicles having steer-by-wire steering systems which omit a direct mechanical connection between a steering handle and the steered vehicle wheels, and in which a steering preference at the steering handle is relayed exclusively electrically. The latter systems include an operating unit actuatable by a driver and by at least one wheel steering angle actuator which is mechanically separate from the operating unit. Further, in both cases such steering systems include at least one actuator unit actuated in a normal operating state using a torque signal from a torque sensor. The actuator unit can be provided for providing a steering torque, for example in the form of a support torque, and/or for generating a steering resistance and/or a reset torque onto the steering handle. Such a steering system is known from DE 10 2008 037 870 B4 and/or DE 10 2018 123 615 A1, for example.

The torque sensors used are also safety-critical components which must be calibrated and/or adjusted particularly precisely in order to avoid errors in the torque signal during driving, as they can lead to uncontrolled movement of the steering handle, lane deviations in automated driving and/or misrecognized contact of the steering handle in automated driving, for example. In this context, in particular, system-immanent deviations as well as aging and wear effects of the torque sensor must be considered.

Therefore, the object of the disclosure is in particular to provide a method for operating a vehicle, the method providing improved features with respect to operational safety and/or functionality. The object is achieved by the features of the disclosure while advantageous configurations and further developments of the disclosure can be found in the disclosure.

SUMMARY

The disclosure relates to a method for operating a vehicle, in particular a motor vehicle. The vehicle comprises a steering system with a steering handle, an actuator unit which is operatively connected to the steering handle, and at least one torque sensor which is paired with the actuator unit for detecting a torque signal.

According to the disclosure, a compensation torque which correlates to a systematic sensor offset of the torque sensor is ascertained in a calibration operational state and is superimposed on the torque signal in an automated drive operation state in order to monitor a contact of the steering handle. Thus, in the present case the compensation torque is determined in the calibration operating state. In addition, in the automated driving state the compensation torque is superimposed onto the torque signal in order to obtain a corrected torque signal, wherein by evaluating the corrected torque signal it is determined whether the steering handle is touched and/or is being touched or not (so-called hands-on detection or hands-off detection). Operational safety can be increased and/or functionality can be improved by means of this configuration. In particular, a particularly precisely calibrated and/or adjusted torque sensor can be provided, advantageously preventing misrecognized contact of the steering handle in automated driving and/or reliably detecting when the steering handle has been impermissibly released during automated driving. Advantageously, an impermissible release of the steering handle in automated driving can be detected and the driver warned and/or the vehicle can be brought to a safe state.

In particular, the steering system can be designed as a conventional steering system, in particular as an electric power steering system, and can comprise a mechanical accessing means. In this case, the actuator unit can be designed as a steering actuator to support a manual torque applied to the steering handle. However, it is preferable for the steering system to be designed as a steer-by-wire steering system and for it to comprise, in particular, an operating unit and at least one wheel steering angle actuator which is mechanically separate from the operating unit, said steering angle actuator being provided for changing a wheel steering angle of at least one vehicle wheel as a function of a steering preference. In this case, the actuator unit is preferably part of the operating unit and is mechanically coupled to the steering handle. It is particularly preferable for the actuator unit to be designed as a feedback actuator for generating a steering resistance and/or a restoring torque onto the steering handle. In addition, the actuator unit is advantageously configured as an electric alternating current motor, in particular as a synchronous motor, and in particular preferably as a permanently-excited synchronous motor, and in a normal operating state is preferably actuated by a feedback controller using the torque signal from the torque sensor. The feedback controller is particularly provided to provide feedback control functionality for operating the actuator unit, and consequently for controlling a movement of the steering handle and/or for adjusting a steering feel. The torque signal of the torque sensor is advantageously used as the feedback variable. Preferably, the feedback controller is also integrated into a control unit of the vehicle, advantageously a control unit configured as a steering control unit.

In addition, a "systematic sensor offset" is intended in particular be understood to mean an offset error of the torque sensor, in particular in a resting position, and/or a deviation, in particular a systematic deviation, from a defined zero position and/or a defined zero point of the torque sensor, in particular in a resting position. The systematic sensor offset is in particular due to the nature of the torque sensor and can include, for example, an initial offset, a system-immanent offset, an offset caused by aging and/or wear effects, an offset caused by internal friction effects, and/or a temperature-related offset. Further, a "calibration operating state" is intended to be an operating state, particularly during operation of the steering system and consequently of the torque sensor in the vehicle, in which the compensation torque is determined. In particular, at least one value of the compensation torque for at least one defined deflection position of the steering handle is determined in this state. However, in the calibration operating state multiple values of the compensation torque are preferably determined for multiple different steering handle deflection positions. The calibration operating state and consequently the determination of the compensation torque could in particular be carried out in a further driving state, for example during a further automated driving of the vehicle. Preferably, however, the calibration operating state, and consequently the determination of the compensation torque, is performed while the vehicle is stationary, and more preferably in a specific service operating mode.

The vehicle also comprises at least one computing unit which is provided to perform the method for operating the vehicle. The term “computing unit” is in particular intended to mean an electrical and/or electronic unit which comprises an information input, an information processor, and an information output. The computing unit advantageously further comprises at least one processor, at least one operating memory, at least one input and/or output means, at least one operating program, at least one control routine, at least one feedback control routine, at least one detection routine and/or at least one monitoring routine. In particular, in the calibration operating state, the computing unit is provided to determine a compensation torque correlated with a systematic sensor offset of the torque sensor. In addition, in the automated driving state, the computing unit is provided at least to evaluate and superimpose the compensation torque onto the torque signal in order to monitor a contact of the steering handle. Moreover, the computing unit can be provided for initializing and/or determining the calibration operating state. Preferably, the computing unit is also integrated into a control unit of the vehicle, advantageously into a control unit configured as a steering control unit. The term “provided” is in particular intended to mean specifically programmed, designed, and/or equipped. The phrase “an object being provided for a specific function” is particular intended to mean that the object fulfills and/or performs this specific function in at least one application and/or operating state.

Advantageously, it is also proposed that the torque signal and the compensation torque be superimposed in the automated driving state in order to produce a corrected torque signal, and that the corrected torque signal be sent to a feedback control monitor in order to monitor the contact of the steering handle. In particular, an especially simple and/or efficient monitoring can be achieved by this.

Further, it is suggested that the compensation torque is determined in the calibration operating state at a point in time and/or in a state in which no contact of the steering handle occurs and/or takes place, in particular in a so-called hands-off state. The compensation torque can thereby be determined advantageously precisely and independent of external influences.

To determine the compensation torque, in the calibration operating state an oscillating torque could be applied to the steering handle, for example by means of the actuator unit and/or in particular by means of an additional oscillating unit. However, it is advantageously proposed that to determine the compensation torque in the calibration operating state, an oscillation is generated in the torque signal, in particular in the form of a dampened vibration, by deflecting the steering handle by actuating the actuator unit and abruptly stopping movement of the steering handle when it reaches a predefined deflection position, in particular by braking the actuator unit. In this case, the actuator unit, the torque sensor, and the steering handle act as an oscillation circuit and accordingly provide dampening of the forced oscillation initiated by the actuator unit. The compensation torque can then be advantageously determined or read out in the oscillation-induced state. Due to the forced oscillation initiated by the actuator unit, the compensation torque can advantageously be easily determined for a defined deflection of the steering handle, in particular inside the vehicle.

Generally, it is possible to determine exactly one value of the compensation torque for exactly one defined deflection position of the steering handle. In this context, for example, it is conceivable to determine a maximum value of the compensation torque or an average value of the compensation torque, and to use it to monitor a contact of the steering handle. However, particularly precise monitoring, particularly for a plurality of steering handle deflections, can be achieved when in the calibration operating state the compensation torque is determined for multiple different steering handle deflection positions and is varied and/or adjusted in the automated driving state as a function of a current steering handle deflection position. Preferably, in the calibration operating state, an oscillation is generated in the torque signal for each of the different deflection positions in that the steering handle is deflected by actuating the actuator unit and movement of the steering handle is abruptly stopped when it reaches the respective deflection position, wherein the corresponding value for the compensation torque is saved together with the corresponding deflection position. In the automated driving state, a current deflection position is then preferably determined and a compensation torque value correlated to the current deflection position is determined and/or read out as a function of the current deflection position, the correlated value then being superimposed onto the torque signal. The compensation torque is particularly advantageously determined for at least four, preferably for at least ten, and particularly preferably for at least twenty, different deflection positions of the steering handle and varied and/or adjusted accordingly in the automated driving state.

Furthermore, it is proposed that in the event that the automated driving state for a defined deflection position lacks a compensation torque, a value of the compensation torque for a next greater steering handle deflection position or a next smaller steering handle deflection position is used. In particular, this can minimize calibration effort while providing a particularly resource-saving method. Alternatively, however, it is also conceivable to determine a value for the corresponding compensation torque by means of interpolation if there is no value of the compensation torque for a defined deflection position.

In a preferred configuration, it is further suggested that the corresponding deflection position is stored in a value table along with the compensation torque value, and that the compensation torque in the automated driving state is retrieved and/or read out from the value table as a function of the current steering handle deflection position. This can achieve a particularly rapid adjustment of the compensation torque to different deflections of the steering handle.

It is further proposed that an execution of the calibration operating state be repeated at regular intervals, for example, at each system start-up or annually or biannually, such as, in particular, during a vehicle inspection and/or customer service visit. The advantage to this is that aging and wear effects of the torque sensor can be accounted for and compensated.

The method for operating the vehicle and the vehicle is not intended to be limited to the application and embodiment described above. In particular, in order to achieve the functioning described herein, the method for operating a vehicle and the vehicle can comprise a number of individual elements, components, and units that differs from the number thereof specified herein.

BRIEF DESCRIPTION OF THE DRAWINGS

Further advantages will become apparent from the description of the drawings hereinafter. The drawings illustrate an embodiment example of the disclosure.

Shown in the Drawings are.

DETAILED DESCRIPTION

Figure 1A:
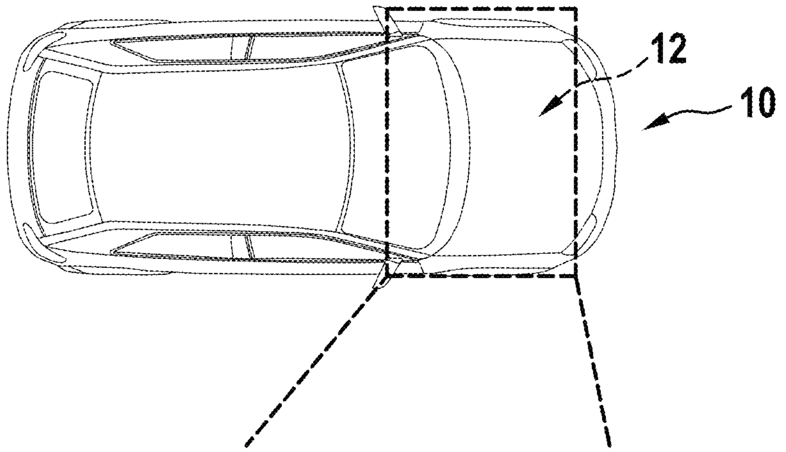
FIGS. 1*a-b* a vehicle comprising a steer-by-wire steering system in a simplified illustration and FIG. 2 a block diagram of a feedback control loop of the steering system, FIGS. 3*a-c* exemplary diagrams of various signals for determining a compensation torque in a calibration operating state, and FIG. 4 an exemplary flowchart showing the main method steps of a method for operating the vehicle.
Figure 1B:
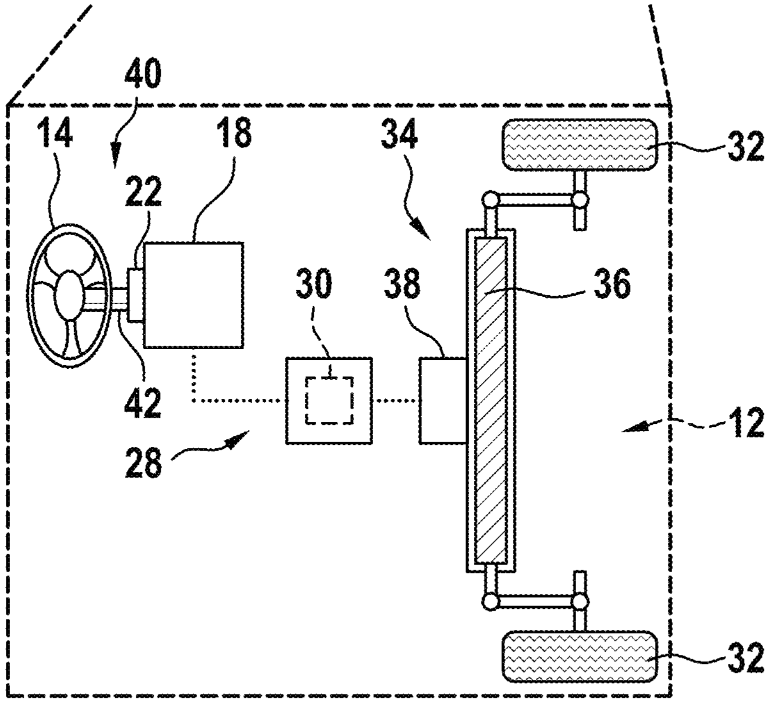

FIGS. 1*a* and 1*b* show a simplified illustration of a vehicle 10, which is, e.g., designed as a passenger vehicle comprising multiple vehicle wheels 32 and a steering system 12. In the present case, the vehicle 10 comprises a manual driving mode and at least one automated driving mode. The steering system 12 is operatively connected to the vehicle wheels 32, and is provided to influence a direction of travel of the vehicle 10. The steering system 12 is further designed as a steer-by-wire steering system in the present case, in which a steering preference is electrically transmitted to the vehicle wheels 32 in at least one operating state. In principle, however, a steering system could also be configured as a conventional steering system, in particular as an electric power steering system.

The steering system 12 comprises a known wheel steering angle actuator 34. The wheel steering angle actuator 34 is designed as a central actuator, for example. The wheel steering angle actuator 34 is operatively connected to at least two of the vehicle wheels 32, in particular two front wheels, and is provided for translating the steering preference into a steering movement of the vehicle wheels 32. For this purpose, the wheel steering angle actuator 34 comprises a steering actuating element 36 designed as a toothed rack, for example, and an actuator unit 38 which cooperates with the steering actuating element 36. Actuator unit 38 is configured as a steering actuator, in particular an electric motor, and is provided for controlling the steerable vehicle wheels 32. A steering system could in principle basically also comprise multiple wheel steering angle actuators, in particular designed as single-wheel actuators. An actuator unit could further comprise a multiple electric motors. In addition, a wheel steering angle adjuster could in principle also be configured as a conventional steering gear, and could be mechanically connected to a steering handle via a steering shaft.

The steering system 12 further comprises an operating unit 40, in particular actuatable by a driver and/or an occupant. The wheel steering angle actuator 34 is mechanically separate from the operating unit 40. The wheel steering angle actuator 34 is purely electrically connected to the operating unit 40. The operating unit 40 comprises a steering handle 14 in the form of, e.g., a steering wheel, and a further actuator unit 18 which is in particular mechanically coupled to the steering handle 14. The further actuator unit 18 is designed as a feedback actuator and is provided at least for generating a steering resistance and/or a restoring torque on the steering handle 14. To this end, the further actuator unit 18 comprises an electric motor (not shown) designed in particular as a permanently-excited synchronous motor. In addition, the operating unit 40 comprises a torsion element 42, in the present case in particular a rotating rod, which is provided as a means of rotation as a function of a movement of the steering handle 14. A steering handle could alternatively also be designed as a joystick, a steering lever, and/or as a steering ball or the like. A further actuator unit could also comprise multiple electric motors. It is also conceivable to connect an operating unit and a wheel steering angle actuator together by means of a steering shaft, for example in a conventional steering system.

The steering system 12 further comprises at least one torque sensor 22. In the present case, the torque sensor 22 is part of the operating unit 40 and is disposed in particular in the area of the torsion element 42. The torque sensor 22 is associated with the further actuator unit 18 here. The torque sensor 22 is provided to detect a torque signal 24 correlated to a rotation of the torsion element 42. In principle, however, a torque sensor could also be configured separately from an operating unit, for example as in a conventional steering system.

The vehicle 10 further comprises a control unit 28. In the present case, the control unit 28 is designed as a central steering control unit, and is therefore part of the steering system 12. The control unit 28 has an electrical connection to the wheel steering angle actuator 34. The control unit 28 also has an electrical connection to the operating unit 40. The control unit 28 is provided for controlling an operation of the steering system 12. In the present case, the control unit 28 is provided for actuating the actuator unit 38 as a function of a signal from the operating unit 40, e.g., as a function of a steering preference and/or a manual torque. The control unit 28 can furthermore be provided to actuate the further actuator unit 18 as a function of a signal from the wheel steering angle actuator 34.

The control unit 28 comprises a computing unit 30 for this purpose. The computing unit 30 comprises at least one processor (not depicted), for example in the form of a microprocessor, and at least one operating memory (not depicted). The computing unit 30 also comprises at least one operating program which is stored in the operating memory and which includes at least one control routine, at least one feedback control routine, at least one detection routine and at least one monitoring routine. However, in principle, a vehicle could also comprise multiple control units, wherein a first control unit with at least a first computing unit is associated with an operating unit, whereas a second control unit with at least a second computing unit is associated with a wheel steering angle actuator. In this case, the first control unit and the second control unit could communicate electrically with each other. A control unit could in principle also be different from a steering system and configured as a central vehicle control unit, for example.

Figure 2:
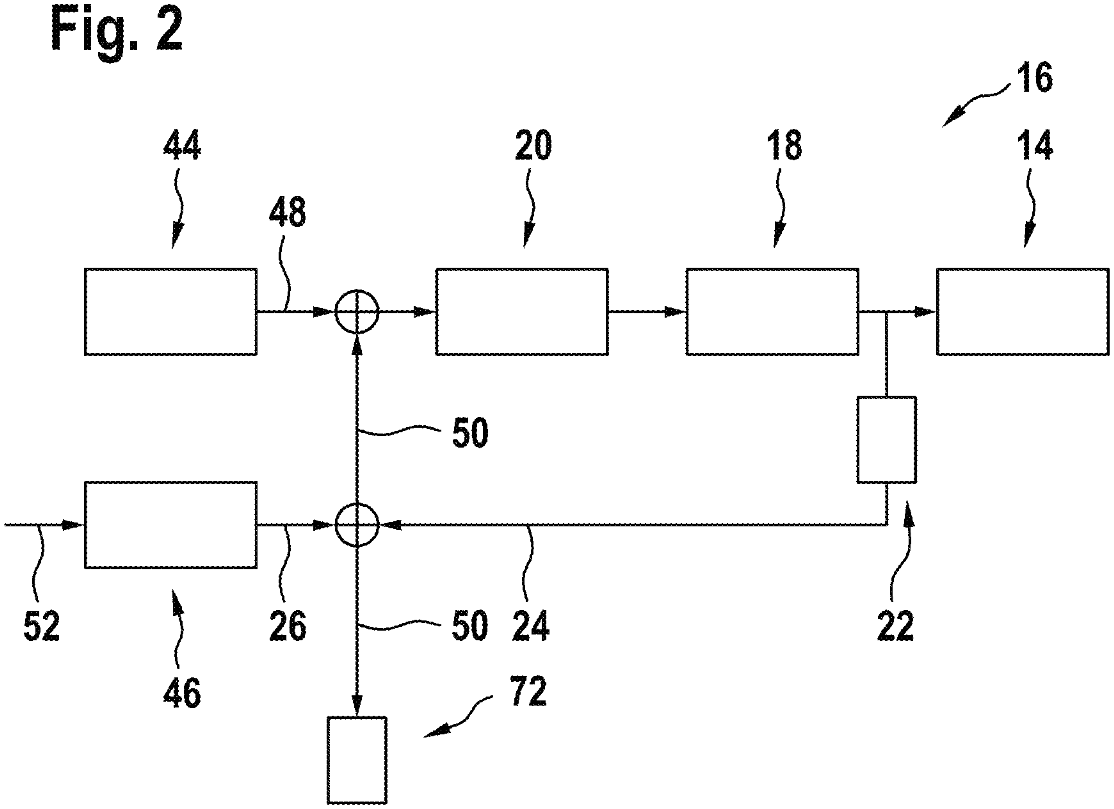

FIG. 2 shows a simplified schematic design of a part of the feedback control unit 28, and in particular a simplified principle block diagram of a control circuit for the further actuator unit 18. In the present case, the steering system 12 comprises a feedback control loop 16. The feedback control loop 16 is operatively connected to the steering handle 14, and in particular serves to regulate a movement of the steering handle 14 and/or to adjust a steering feel noticeable at the steering handle 14.

The feedback control loop 16 includes the further actuator unit 18 as well as the torque sensor 22, wherein the torque signal 24 of the torque sensor 22 serves as the feedback variable. In addition, the feedback control loop 16 comprises an electrical and/or electronic feedback controller 20 for controlling the further actuator unit 18. The feedback controller 20 is integrated into the control unit 28 and has an electrical connection to the computing unit 30. Also, the feedback controller 20 is configured as a torque feedback controller, in the present case in particular as a state feedback controller. Moreover, in the present case, the feedback control loop 16 includes a steering feel module 44. The steering feel module 44 is integrated into the control unit 28 and has an electrical connection to the computing unit 30. The steering feel module 44 is provided to provide a target specification 48 for a steering feel, in particular one that is perceptible at the steering handle 14, and to supply the same to the feedback controller 20 as a guide parameter. However, it is also alternatively conceivable to completely forgo a steering feel module. Furthermore, functionality of a steering feel module and/or a feedback controller could also be integrated into a computing unit. It is further conceivable to completely forego a feedback control loop.

The torque sensor 22 used is a safety-critical component. Accordingly, the torque sensor 22 must be calibrated and/or adjusted particularly precisely to avoid errors in the torque signal 24 during travel. However, such torque sensors can have a systematic sensor offset, which is due to the nature of the respective torque sensor and can comprise, for example, a system-immanent offset and/or an offset caused by aging and/or wear effects. The sensor offset results in a control deviation being unequal to zero in a so-called hands-off state in which a feedback control deviation is actually intended to disappear, consequently resulting in no controlling of the further actuator unit 18. Actuation of the further actuator unit 18 initiated thereby can then lead to uncontrolled movement of the steering handle 14 and thereby to a misrecognized contact of the steering handle 14 and/or misrecognized releasing in automated driving.

In order to now increase operational safety and/or improve functionality, a method for operating the vehicle is proposed below. In the present case, the computing unit 30 in particular provided to carry out the method and in particular comprises a computer program having corresponding program code means for this purpose. Alternatively, however, a first computing unit of a first control unit, associated with an operating unit, could also be provided for carrying out the method.

In the present case, in a calibration operating state, a compensation torque 26 is determined that is correlated to a systematic sensor offset of the torque sensor 22. In addition, the determined compensation torque 26 in an automated driving state is evaluated and superimposed onto the torque signal 24 in order to monitor a contact of steering handle 14. In addition, the determined compensation torque 26 can be fed to the feedback control loop 16 to reduce and in particular compensate the systematic sensor offset of torque sensor 22, and can be offset against at least one signal of the feedback control loop 16, advantageously against the torque signal 24. However, in principle, such compensation of the systematic sensor offset of the torque sensor 22 could also be omitted.

The calibration operating state is carried out during operation of steering system 12 and consequently of the torque sensor 22 in the vehicle 10, preferably while the vehicle 10 is stationary. For example, to activate the calibration operating state, the vehicle 10 can include a specific service operating mode which can be activated by a driver and/or occupant of the vehicle 10 or by a service employee, for example, via an on-board computer. Further, the compensation torque 26 is determined at a point in time and/or in a state in which no contact of the steering handle 14 occurs and/or takes place, in particular in a so-called hands-off state. Here, execution of the calibration operating state can in principle be repeated at regular time intervals or depending on the situation, i.e. if necessary. However, a calibration operating state could generally also be performed in a further driving state, for example during automated driving.

In the present case, to determine the compensation torque 26 in the calibration operating state, an oscillation is generated in the torque signal 24 by deflecting the steering handle 14 by actuating the further actuator unit 18 and abruptly stopping movement of the steering handle 14, by braking the further actuator unit 18, when it reaches a predefined deflection position. In this case, the further actuator unit 18, torque sensor 22, and the steering handle 14 act as an oscillation circuit and accordingly provide dampening of the forced oscillation initiated by the further actuator unit 18. The compensation torque 26 can then be determined or read out in the oscillation-induced state. In this context, use is made of the fact that system-immanent hysteresis in the torque sensor 22 can be eliminated by the forced oscillation, the hysteresis being caused in particular by internal friction in the torque sensor 22 which causes a deviation from a zero position and/or a zero point. On the other hand, due to oscillation in the form of the dampened oscillation, the torque sensor 22 or the torque signal 24, moves about the actual zero position and/or the actual zero point and ultimately settles on the actual zero. In principle, there is thus a similar effect as in the demagnetization of a permanent magnet by means of an alternating magnetic field. The compensation torque 26 can then be determined based on the actual zero position and/or the actual zero point. Alternatively, however, it is also conceivable to apply an oscillating torque to a steering handle by means of an actuator unit and/or an, in particular additional, oscillating unit, and thereby generate a forced oscillation.

Moreover, the compensation torque 26 is determined in the calibration operating state for multiple different deflection positions of the steering handle 14. To this end, for the different deflection positions, an oscillation is generated in the torque signal 24 for each of the different deflection positions in that the steering handle 14 is deflected by actuating the actuator unit 18 and movement of the steering handle 14 is abruptly stopped when it reaches the respective deflection position. The corresponding value for the compensation torque 26 is then saved together with the corresponding deflection position and preferably stored in a memory unit 46, in particular non-volatile, preferably in the form of a table of values. In the present case, the compensation torque 26 is determined for at least twenty-five different deflection positions of the steering handle 14. In principle, however, precisely one value of a compensation torque, for example a maximum value, could also be determined for precisely one defined deflection position of a steering handle.

In the automated driving state, the compensation torque 26, particularly that determined in the calibration operating state, is superimposed onto the torque signal 24 in order to generate a corrected torque signal 50. The corrected torque signal 50 can then be sent to a monitor 72 in order to monitor the contact of the steering handle 14, wherein by evaluating the corrected torque signal 50 it is determined whether the steering handle 14 is touched and/or is being touched or not (so-called hands-on detection or hands-off detection). The monitor 72 is configured as a feedback control monitor and in the present case is operatively connected to the feedback control loop 16. Also, the monitor 72 is integrated into the control unit 28 and has an electrical connection to the computing unit 30.

Moreover, the compensation torque 26 can be supplied to the feedback control loop 16 and can be offset against at least one signal of the feedback control loop 16. In the present case, the torque signal 24 is superimposed onto the compensation torque 26 in order to generate the corrected torque signal 50. In addition to the reduction and in particular compensation of the systematic sensor offset of the torque sensor 22, the corrected torque signal 50 can then be offset against the target specification 48 of the feedback controller 20, or can be directly supplied as an input variable to the feedback controller 20. However, in principle, such compensation of the systematic sensor offset of the torque sensor 22 could also be omitted.

Moreover, in the automated driving state, the compensation torque 26 is varied and/or adjusted as a function of a current deflection position 52 of the steering handle 14. To do so, a current deflection position 52 of steering handle 14 is first determined, and a value of the compensation torque 26 associated with the current deflection position 52 is determined. The compensation torque 26 is then retrieved and/or read out from the memory unit 46 and in particular the table of values as a function of the current deflection position 52 of the steering handle 14, and is superimposed onto the torque signal 24. In the event that a value of the compensation torque 26 is lacking for a defined deflection position, a value of the compensation torque 26 for a next greater steering handle 14 deflection position or a next smaller steering handle 14 deflection position is used. Alternatively, however, missing values could also be determined by means of an interpolation.

Figure 3A:
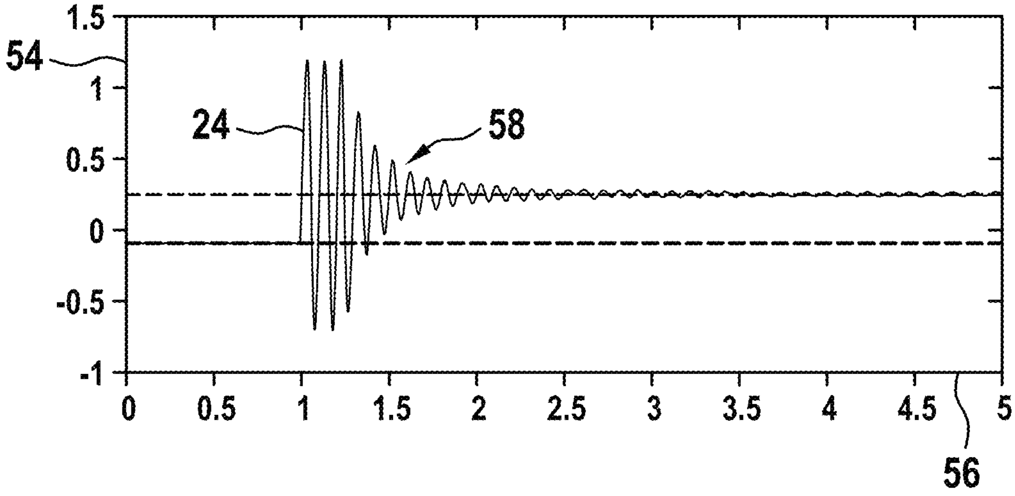
Figure 3B:
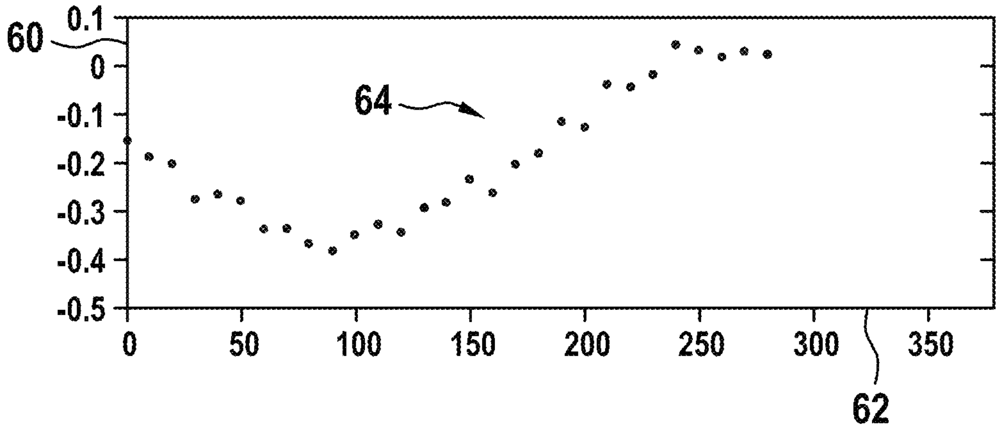
Figure 3C:
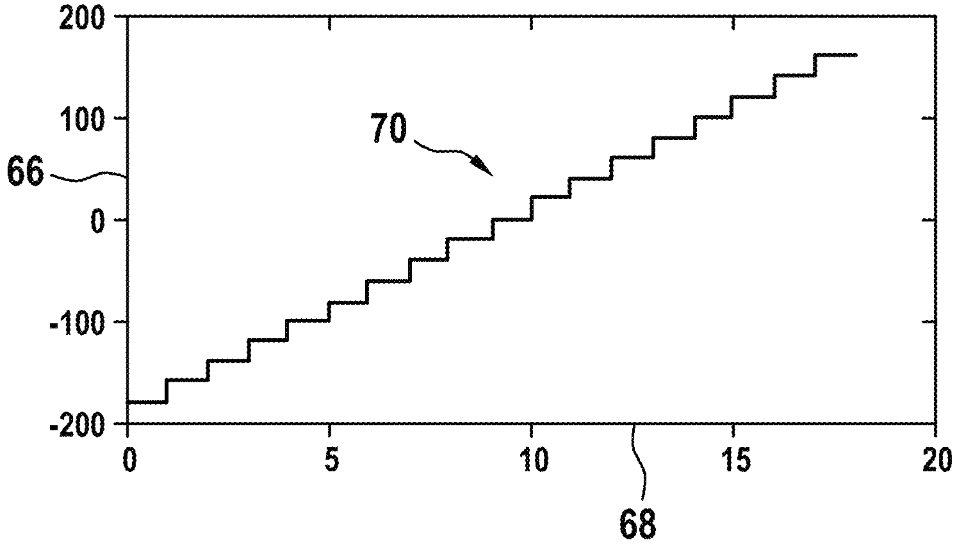

FIGS. 3*a* to 3*c* show exemplary diagrams of various signals for determining the compensation torque 26 in the calibration operating state.

In FIG. 3*a*, a torque is plotted in [Nm] on an ordinate axis 54. A time is shown in [s] on an abscissa axis 56. A curve 58 shows a trending of the torque signal 24 in the calibration operating state.

The torque signal 24 trend indicates that system-immanent hysteresis in the torque sensor 22 can be eliminated by the forced oscillation. Due to oscillation, in the form of the damped oscillation, the torque sensor 22 or the torque signal 24, moves about the actual zero position and/or the actual zero point and ultimately settles on the actual zero.

In FIG. 3*b*, the sensor offset of the torque sensor 22 is plotted on an ordinate axis 60 in [Nm]. In this case, a deflection of the steering handle 14, in particular in the form of a steering angle, is shown in [° ] on an abscissa axis 62. A set of points 64 shows a trending of the sensor offset of the torque sensor 22 for multiple different deflection positions of steering handle 14.

The trending of the sensor offset of the torque sensor 22 indicates that the sensor offset fluctuates as a function of the deflection positions of the steering handle 14. Accordingly, in order to realize a particularly precise monitoring function, the compensation torque 26 is advantageously determined for a plurality of different deflection positions of the steering handle 14.

In FIG. 3*c*, a deflection of the steering handle 14, in the present case in the form of a steering angle, is plotted in [° ] on an ordinate axis 66. A time is shown in [s] on an abscissa axis 68. A curve 70 depicts the method for determining the compensation torque 26 in the calibration operating state, wherein an oscillation is generated in the torque signal 24 by deflecting the steering handle 14 by actuating the further actuator unit 18, and movement of the steering handle 14 is abruptly stopped by braking the further actuator unit 18 when it reaches a respective deflection position. This results in the stepwise shape of curve 70 shown in FIG. 3*c*.

Figure 4:
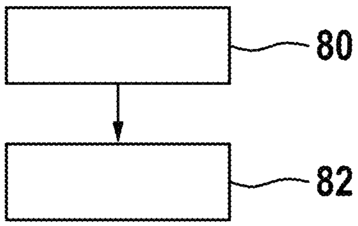

Finally, FIG. 4 shows an exemplary flowchart with the main method steps of the method for operating the vehicle 10.

A method step 80 corresponds to a calibration operating state in which the compensation torque 26 correlated to the systematic sensor offset of the torque sensor 22 is determined. In this step, a service operating mode is first activated, and then, in order to determine the compensation torque 26, an oscillation is generated in the torque signal 24 by deflecting the steering handle 14 by controlling the further actuator unit 18 and abruptly stopping movement of the steering handle 14, by braking the further actuator unit 18, when it reaches a predefined deflection position. In addition, the determination of the compensation torque 26 can be repeated for multiple different deflection positions of the steering handle 14.

A method step 82 corresponds to an automated driving state in which the compensation torque 26 is evaluated and superimposed onto the torque signal 24 in order to monitor a contact of the steering handle 14. To this end, the torque signal 24 and the compensation torque 26 are superimposed onto each other and sent to the monitor 72. Moreover, in this case the compensation torque 26 is varied and/or adjusted as a function of a current deflection position 52 of the steering handle 14.

The exemplary flowchart in FIG. 4 is merely intended to describe, by way of example, a method for operating the vehicle 10. In particular, individual method steps can also vary, or additional method steps can be added. In this context, it is conceivable, for example, to apply an oscillating torque to a steering handle by means of an actuator unit and/or an in particular additional oscillating unit, and thereby generate a forced oscillation and/or determine precisely one value of a compensation torque, for example a maximum value, for precisely one defined deflection position of a steering handle. Furthermore, varying and/or adjusting a compensation torque as a function of a current deflection position of a steering handle could also be omitted. In addition, the method could also be applied analogously to a conventional steering system, in particular an electric power steering system wherein a steering actuator is used in this case as the actuator unit for supporting a manual torque applied to a steering handle.

The invention claimed is:

1. A method for operating a motor vehicle, wherein the vehicle comprises a steering system with a steering handle, an actuator unit which is operatively connected to the steering handle, and at least one torque sensor which is paired with the actuator unit and configured to detect a torque signal, the method comprising:

in a calibration operational state:

actuating the actuator unit to deflect the steering handle and abruptly stopping movement of the steering handle when the steering handle reaches a predefined deflection position so as to generate a damped oscillation in the torque signal, the damped oscillation having an amplitude that decays over time; and ascertaining a compensation torque based on the damped oscillation, the compensation torque correlating to a systematic sensor offset of the torque sensor; and in an automated drive operation state of the motor vehicle:

detecting a current value of the torque signal;

superimposing the ascertained compensation torque on the current value of the torque signal to generate a corrected torque signal; and monitoring whether a driver is in contact with the steering handle based on the corrected torque signal.

2. The method of claim 1, further comprising, in the automated drive operation state:

transmitting the corrected torque signal to a monitor, wherein the monitor is configured to monitor whether the driver is in contact with the steering handle.

3. The method according to claim 1, wherein, in the calibration operational state, the compensation torque is determined at a time when no contact with the steering handle occurs and/or takes place.

4. The method according to claim 1, wherein:

in the calibration operational state, the compensation torque is determined for multiple different steering handle deflection positions, and in the automated driving operation state, the compensation torque is varied as a function of a current steering handle deflection position.

5. The method according to claim 4, wherein, in the automated driving operation state, in response to a lack of compensation torque for the current steering handle deflection position, a value of the compensation torque for a next greater deflection position of the steering handle or a next smaller deflection position of the steering handle is used.

6. The method according to claim 4, wherein:

in the calibration operational state, each of the multiple different steering handle deflection positions along with the corresponding compensation torque value are stored in a value table, and in the automated driving operation state, the compensation torque is retrieved from the value table as a function of the current deflection position of the steering handle.

7. The method according to claim 1, wherein an execution of the calibration operating state is repeated at regular time intervals.

8. A control unit comprising a computing unit configured to carry out the method according to claim 1.

9. A motor vehicle, comprising:

a steering system, which comprises a steering handle, an actuator unit operatively connected to the steering handle, and at least one torque sensor which is paired with the actuator unit and configured to detect a torque signal; and a computing unit configured to:

in a calibration operational state:

actuate the actuator unit to deflect the steering handle and abruptly stop movement of the steering handle when the steering handle reaches a predefined deflection position so as to generate a damped oscillation in the torque signal, the damped oscillation having an amplitude that decays over time; and determine a compensation torque based on the damped oscillation, the compensation torque correlating to a systematic sensor offset of the torque sensor; and in an automated drive operation state:

detect a current value of the torque signal;

superimpose the compensation torque on the current value of the torque signal to generate a corrected torque signal; and monitor whether a driver is in contact with the steering handle based on the corrected torque signal.

10. The vehicle of claim 9, wherein the steering system is a conventional electric power steering system and the actuator unit is configured as a steering actuator for supporting a manual torque applied to the steering handle.

11. The vehicle according to claim 9, wherein the steering system is a steer-by-wire steering system and the actuator unit is configured as a feedback actuator designed to generate a steering resistance and/or a reset torque on the steering handle.

* * * * *